Oct. 14, 1958  W. A. KREBS  2,856,548
ELECTRIC MOTOR FRAME CONSTRUCTION
Filed June 27, 1956

INVENTOR.
WILLIAM A. KREBS
BY *Golrick and Golrick*
ATTORNEYS

United States Patent Office 2,856,548
Patented Oct. 14, 1958

2,856,548

ELECTRIC MOTOR FRAME CONSTRUCTION

William A. Krebs, Ravenna, Ohio, assignor, by mesne assignments, to American Machine and Metals, Inc., New York, N. Y., a corporation of Delaware Application June 27, 1956, Serial No. 594,274

1 Claim. (Cl. 310—60)

The present invention relates generally to motor frame construction, more particularly to a frame construction for relatively small horsepower ventilated motors and specifically to a frame construction for a self-ventilated motor adapted to die casting production in a few simple elements and particularly suitable for fractional horsepower induction motors.

In fractional horsepower motors for many applications, there is need of construction which includes provision for ventilation of the motor and yet is compact considered relative to the power rating. Competitive demands require further that such motors be rugged and simple in construction, and readily produced at minimum manufacturing cost for the physical and electrical characteristics desired. In many instances, because of the intended environment of use, excellent cooling of the motor must be obtained and this usually militates against the simplicity, compactness and low cost of production obviously desired.

By the present invention there is provided a motor of the type wherein the rotor carries ventilating fan blade elements, comprised of only three further principal structural elements namely, a stator with stator field coils wound thereon and two similar end bells or bearing brackets fitted to opposite ends of the stator and secured by longitudinal bolts. In this construction the usual stack of stator or field laminations is held together by die cast metal such as aluminum or an aluminum alloy forming the clamping rings at the ends of the stack joined by integral tie bars or rods of the cast metal extending through suitably aligned perforations or peripheral notches in the stator stack. Further annular formations in the stator unit thus formed include integral endwise extending generally cylindrical flanges, rabbeted endwise to receive and locate the short cylindrical flanges or rims of the shaft bearing supporting end bells, so that the frame pieces may be held together by longitudinal bolts passed through the end bells and stator. Further, in the very casting of the stator unit suitable radially opening spaced ventilating apertures are provided interrupting the projecting cylindrical end flanges, which may be spaced as desired or needed and located roughly radially outward of the intended locus of the fan blade elements on the rotor. Thus upon assembly of the end bells on the rabbeted ends of the stator, ventilating outlets are formed.

The end bells, likewise adapted to be die cast, are of generally circular form, each having a cylindrically flanged rim adapted to fit endwise on the corresponding portion of the stator and a suitable central bearing and lubricant wadding socket or sockets supported by an integral spider structure connecting the same to the rim. The spider structure is part of an apertured grill work enclosing the motor endwise and including a short concentric conical portion as a ventilating air inlet, for directing air to impinge upon the bearing socket structure in passing inwardly toward the center or intake region of a corresponding centrifugal fan structure, formed as in the case of an induction motor, at each end of the rotor.

This frame construction is particularly useful in the case of an induction motor using a known rotor structure formed by die casting—as an integral structure on a rotor lamination stack—end conductor rings with centrifugal fan blades projecting endwise therefrom, and connecting conductor bars passing through corresponding slots formed by properly aligned stator laminations, the conductor elements of the rotor thus serving also to clamp the rotor laminations together.

In a motor of this construction of course motor cooling is aided by the use of the integrally cast fan blades on the end ring-conductor bar metal mass, since heat conduction and dissipation are aided by the close physical contact of the end rings and fan blades with both conductors and laminations, by the relatively high heat conductivity of the electrical conductor material, and the greater heat dissipation area. In like fashion, in the stator structure of this invention, the intimate close contact of the integrally cast metal and its larger integral area for heat dissipation aids conduction and dissipation of heat from the stator elements. Further the end bell air inlet determines a path of the ventilating air endwise through each bearing bracket where a large heat dissipation surface for bearing heat is encountered, and also directs the incoming air first upon the bearing socket region. Thus greater bearing cooling is achieved through air unheated by the electrically heated portions of the system. The air then passes radially from the fan outwardly past the ends of the pole faces and windings of the stator and through the ventilating openings in the stator end rings.

The general object of the invention is then to provide a motor structure adapted to die cast production of end bells and of a stator frame unit which further lends itself to compact design embodying provision for effective and improved air cooling of the motor. A further object is the provision of a motor embodying frame elements few in number and of simple rugged low cost construction. Other objects and advantages of the invention will appear from the following description and the drawings wherein.

Figure 1:
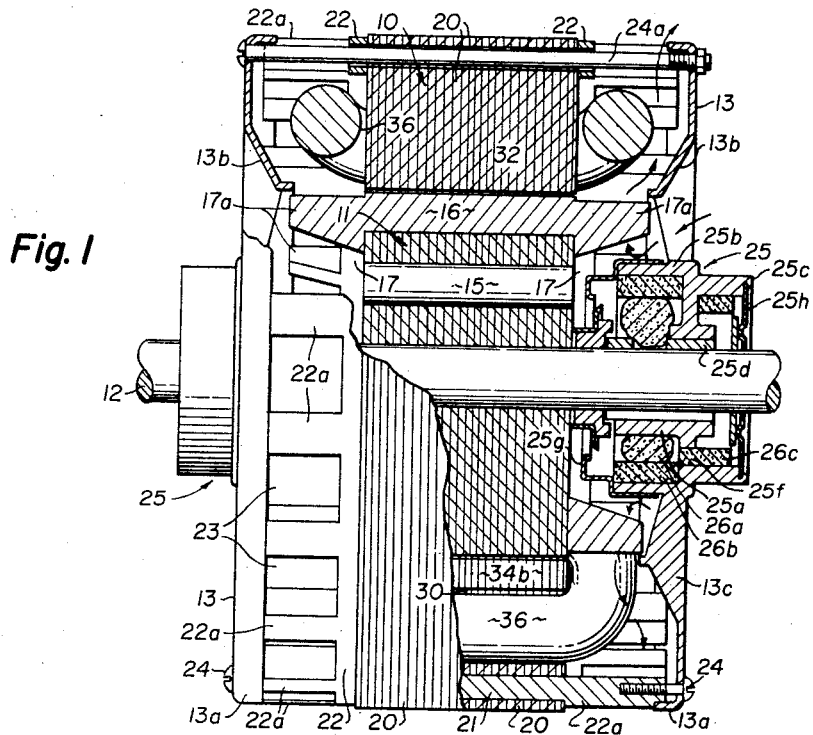
Fig. 1 is a side view of the motor of this invention with certain parts broken away, and showing partial sections taken at two different axial planes as indicated by line 1—1 in Fig. 2.

In the drawings there appears a six-pole shaded-pole, single phase induction motor, the overall structure of which is best seen in Fig. 1 as including a stator 10, rotor 11, the latter including of course a shaft 12, and rotor supporting end brackets 13. The rotor, having a well known construction, is constituted of round laminations, which are die-punched identically from electrical grade soft iron sheet stock in such shape as to form when in stacked alignment a central shaft aperture, a series of circumferentially equally spaced rotor bar slots opening radially, and several round ventilating openings 15 equally spaced around the shaft aperture and extending lengthwise through the rotor; and a set of rotor bars 16, and connecting shorting end rings 17. Each end ring includes a plurality of circumferentially spaced, endwise projecting blade formations 17a, thereby forming a ventilating fan impeller carried at each end of the rotor.

The rotor bars, end rings and fan blades are formed as an integral die cast structure, of aluminum or aluminum alloy cast onto a stack of aligned lamination clamped in a die casting mold, the tooling and process of which operation is known art. The longitudinal conductors, thus formed in suitable lamination stack slots to integrally join the end rings, also hold the laminations tightly together in the rotor. After the rotor element is cast, as by centrifugal casting methods and apparatus known to the art, thereafter with the rotor shaft fixed in place, the rotor perimeter is turned down to precise size and finish coaxial with the shaft by using the shaft as a means for chucking or centering the unit.

The stator as here shown has a core 20 comprised of stacked aligned like die-punched laminations of electrical soft sheet iron, annular disks in general outline with a shape for pole and coil slots desired in the motor. These stator laminations are also held clamped together as a stator core and frame unit, by an integrally cast aluminum or aluminum structure including longitudinal tie bars 21 running externally of or through aligned edge apertures of the lamination stack or core and rings 22 on outer peripheral portions of the end faces of the stack. Extending endwise relative to the core are projections 22a integral with respective rings 22 and externally rabbeted at 22b to receive the respective inwardly flanged circular rims 13a of the shaft bearing supporting bracket plates or end bells 13 fitted thereto and held by screws 24 threaded endwise into the ring structure or by nuts and bolts 24a extending through the core. Each ring 22 may be considered to have a cylindrical endwise projecting flange portion with circumferentially spaced endwise slots forming at each end of the motor unit a circumferentially spaced series of ventilating air outlets 23 between the circularly continuous portions of ring 22, the end plate and the rabbeted projections 22a to which the plate is fitted.

The stator likewise may be fabricated by clamping a stack of lamination punchings in aligned axially compressed relation in a suitable casting mold fixture and then casting aluminum alloy thereabout to form ring 22 with projections 22a and the horizontal tie bars 21. Then the ends of projection 22a may be rabbeted to form arcuate surfaces 22b coaxial with the axis of the core opening wherein the rotor is received.

At the center of each end plate 13 an integral hub portion 25, having coaxial inwardly projecting internal and external cylindrical portions 25a, 25b and an outwardly extending coaxial cylindrical portion 25c, provides a shaft bearing receptacle and housing for lubrication-retaining wicking in the form of the felt ring 26c in outer portion 25c, and the wadding 26a with surrounding felt ring 26b between the inwardly extending cylinders. The bearing here shown is a sleeve bearing 25d pressed into the central end plate opening through 25a as a bearing seat, with aligned radial apertures in the sleeve bearing and cylinder 25a for access of lubricant to the shaft from wadding 26a. Portions of ring 26c extend through hub openings at 25f into contact with the inner wicking for lubricant distribution.

On either side of the bearing, oil slinging rings are carried by the shaft within the spaces defined by the apertured cap 25g pressed on 25b and by the apertured retainer plate 25h secured in the mouth of 25c. Oil encountering these rings is thus returned to the wicking to prevent loss within or without the motor. An annular motor ventilation air inlet formed about the bearing housing hub 25 by an integral conically tapered inward flange 13b terminating about the outer end edges of rotor blades 17a, is spanned by a plurality of spider arms 13c radiating to the flange 13b from hub 25 to support the latter.

Hence cool air is drawn into the motor and directed by the inlet flange over the bearing housing, then reaches the center of the fan impeller whence it passes over the stator coils and stack ends to be expelled through outlets 23. Thus in addition to the rotor and stator cooling—by the ventilating apertures in the rotor and to some degree by the apertures 30 in stator, by air contact on impeller blades integral with rotor conductors, and by contact with the stator windings, stator iron and cast stator elements— the fact that incoming cool air first is directed to the bearing housing gives a greatly improved bearing cooling action.

Six lengthwise apertures 30, opening through interpole gaps 31 to the inner periphery of the stator and in crosssection being of elongated roughly oval form symmetrical about the radical centerline of the interpole gap, define the several identical salient stator poles 32 with pole axes or centerlines "P" radial to the rotor axis; and thereby provide a pair of coil slots 33 on opposite sides of each pole running from the pole tips toward the pole axis into which the stator coil 36 is wound.

Figure 2:
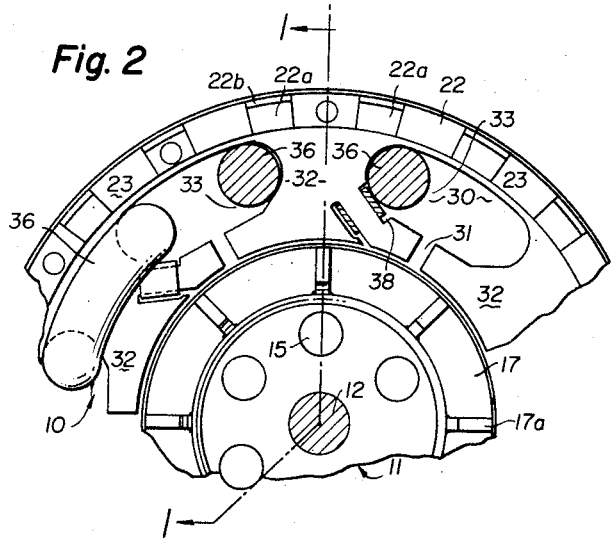
Fig. 2 is a fragmentary end view of the motor, with certain portions removed or broken away.

In Fig. 2 an endwise vew is shown the relationship of the rotor fan construction to the radially surrounding stator construction.

Figure 3:
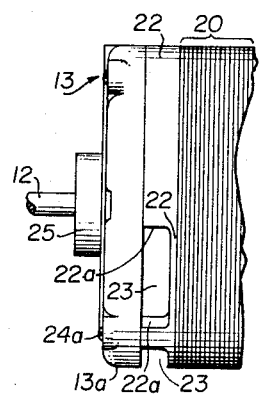
Fig. 3 is a fragmentary side view showing an air outlet modification of the stator portion of the frame.

In Fig. 3 there appears the left end portion of a motor, in side elevation corresponding to the showing in Fig. 1, indicating another form of stator end ring structure 22 cooperating with end bells 13 to provide air outlet openings 23. Elements analogous to those of Fig. 1 bear like numerals. In this case in place of a series of smaller outlets resulting from relatively narrower slots spaced around the entire circumference in the cylindrical projection from each end clamping portion of the stator casting, three elongated openings are used in each end ring structure 22 to provide flow area of the necessary capacity in the lower half of the circumference of the cylindrical flange or projection. Here again the endwise projecting portions of the stator casting are rabbeted to receive the end bell flanged rims fitted thereon.

I claim:

In a fractional horsepower electric motor having a rotor with centrifugal ventilating fan blade elements projecting endwise from each end thereof, the frame structure comprising: a generally cylindrical stack of stator laminations compressed into a stator core, end clamping rings on opposite ends of the stack and longitudinally extending tie rods integrally cast with said rings on the core stack to hold the same as a unit, the end rings including integral endwise projecting cylindrical portions coaxial with the rotor axis, the cylindrical portions having integrally formed endwise slots to provide a plurality of air outlets, and the ends of said cylindrical portions between said slots being rabbeted; and peripherally cylindrically flanged opposite end plates fitted onto the rabbeted portions of the end rings; each said end plate including an integral hub portion providing an inwardly extending rotor shaft bearing housing coaxial with the flanged periphery of the plate and terminating in the space radially inward of the locus of the adjacent fan blade elements of the rotor, an annular air inlet formation around said hub and spanned by integral spider arms supporting the hub, and an integral inward conical air inlet flange formed on the end plate converging toward and terminating circumferentially about the outer end edges of the adjacent fan impeller blades, whereby air drawn into the motor is directed upon the bearing housing before becoming heated by the rotor or stator structures.

References Cited in the file of this patent

UNITED STATES PATENTS

| 2,753,473 | Ham | July 3, 1956 |

FOREIGN PATENTS

| 83,983 | Sweden | July 30, 1935 |
| 181,867 | Great Britain | June 29, 1922 |
| 833,980 | Germany | Mar. 13, 1952 |